United States Patent
Murayama

(10) Patent No.: US 10,345,579 B2
(45) Date of Patent: Jul. 9, 2019

(54) SCANNER MIRROR

(71) Applicant: Funai Electric Co., Ltd., Daito, Osaka (JP)

(72) Inventor: Manabu Murayama, Hyogo (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 16 days.

(21) Appl. No.: 15/689,312

(22) Filed: Aug. 29, 2017

(65) Prior Publication Data

US 2018/0059408 A1 Mar. 1, 2018

(30) Foreign Application Priority Data

Sep. 1, 2016 (JP) .................. 2016-170681

(51) Int. Cl.
| | | |
|---|---|---|
| G02B 26/10 | (2006.01) | |
| H04N 1/113 | (2006.01) | |
| G02B 26/08 | (2006.01) | |
| H04N 1/028 | (2006.01) | |
| G02B 5/09 | (2006.01) | |
| G02B 27/14 | (2006.01) | |
| G01S 17/42 | (2006.01) | |
| G01S 7/481 | (2006.01) | |

(52) U.S. Cl.
CPC .......... *G02B 26/105* (2013.01); *G01S 7/4811* (2013.01); *G01S 7/4814* (2013.01); *G01S 7/4816* (2013.01); *G01S 7/4817* (2013.01); *G01S 17/42* (2013.01); *G02B 5/09* (2013.01); *G02B 26/08* (2013.01); *G02B 27/143* (2013.01); *H04N 1/0283* (2013.01); *H04N 1/113* (2013.01)

(58) Field of Classification Search
CPC ........ G02B 26/105; G02B 5/09; G02B 26/08; G02B 27/143; G01S 7/4811; G01S 7/4814; G01S 7/4816; G01S 7/4817; G01S 17/42; H04N 1/0283; H04N 1/113
USPC .................... 359/201.2, 212.1, 213.1, 214.1
See application file for complete search history.

(56) References Cited

U.S. PATENT DOCUMENTS

| | | | |
|---|---|---|---|
| 10,139,476 B2 * | 11/2018 | Leduc .................. | G01S 7/4817 |
| 2012/0092741 A1 * | 4/2012 | Hudman .............. | G02B 26/101 |
| | | | 359/212.1 |
| 2013/0229645 A1 * | 9/2013 | Suzuki ................... | G01S 17/02 |
| | | | 356/5.01 |

(Continued)

FOREIGN PATENT DOCUMENTS

| | | |
|---|---|---|
| DE | 102009049809 A1 | 6/2011 |
| EP | 1669790 A1 | 6/2006 |

(Continued)

OTHER PUBLICATIONS

Extended European Search Report of the corresponding European Application No. 17188545.2, dated Jan. 22, 2018.

*Primary Examiner* — Frank G Font
(74) *Attorney, Agent, or Firm* — Global IP Counselors, LLP

(57) ABSTRACT

A scanner mirror includes a reflecting mirror and a driver. The reflecting mirror has first and second reflectors that are pivotally arranged about a pivot axis. The first and second reflectors have light receiving faces, respectively. The light receiving faces face in directions that are angularly offset with each other about the pivot axis. The driver drives the reflecting mirror to pivot the first and second reflectors within a specific angle range.

20 Claims, 8 Drawing Sheets

(56) References Cited

U.S. PATENT DOCUMENTS

2013/0250388 A1* 9/2013 Nozaki ................ G02B 26/101
                                                    359/214.1
2017/0212222 A1* 7/2017 Leduc .................... G01S 7/4817
2018/0217258 A1* 8/2018 Hirasawa ................ G01S 17/42

FOREIGN PATENT DOCUMENTS

| EP | 2863253 A1 | 4/2015 |
| EP | 2975447 A1 | 1/2016 |
| JP | 2007-164137 A | 6/2007 |

* cited by examiner

SCANNER MIRROR

CROSS-REFERENCE TO RELATED APPLICATIONS

This application claims priority to Japanese Patent Application No. 2016-170681 filed on Sep. 1, 2016. The entire disclosure of Japanese Patent Application No. 2016-170681 is hereby incorporated herein by reference.

BACKGROUND

Field of the Invention

The present invention generally relates to a scanner mirror. More specifically, the present invention relates to a scanner mirror including reflectors having light receiving faces.

Background Information

Scanner mirrors including mirrors that reflect light from a light source have been known in the art (see Japanese Laid-Open Patent Application Publication No. 2007-164137 (Patent Literature 1), for example).

The above-mentioned Patent Literature 1 discloses an optical scanning device. The optical scanning device includes a vibrating mirror module (scanner mirror) that is resonance driven in a state in which two movable mirrors are fixed side by side to a single torsional beam that serves as the rotational axis (pivot axis). The optical scanning device discussed in Patent Literature 1 is installed in an electrophotographic image formation device. The two movable mirrors in the vibrating mirror module are fixed to the torsional beam in a state in which the reflecting faces are aligned in the same plane (i.e., a state in which the two reflecting faces are parallel to each other). The light beam (exit light) emitted from the light source unit is incident on the vibrating mirror module via a polygon mirror, and is emitted (reflected) toward a photosensitive drum via the two movable mirrors. The two movable mirrors are resonance driven in a state in which their reflecting faces are aligned in the same plane. With this configuration, the light beam is scanned over the surface of the photosensitive drum.

SUMMARY

The vibrating mirror module discussed in Patent Literature 1 is used as an optical scanning device in which the light beam (exit light) from the light source unit is emitted (reflected) toward the surface of the photosensitive drum. Meanwhile, it is conceivable that this vibrating mirror module is applied, for example, to a device with which the reflected light from an object is received, and reflected/guided toward a light receiving element (photodetector) in a ranging device and the like. In this case, the two light receiving mirrors are pivoted so as to synchronize with the exit light during scanning toward the region in which the object is located. Thus, it is the role of the two light receiving mirrors to receive the reflected light reflected from the object while reflecting it to the light receiving element (photodetector). Here, the two light receiving mirrors are pivoted by using the torsional beam as the rotational axis in a state in which their reflecting faces are aligned in the same plane. Thus, the light receiving surface area over which the reflected light is received by the light receiving mirrors naturally increases or decreases according to changes in the incidence angle of the reflected light (displacement of the light receiving mirrors) in a single scan operation. In other words, the effective light receiving surface area of the light receiving mirrors as seen from the light receiving element is repeatedly increased and decreased according to displacement of the light receiving mirrors.

Thus, when the vibrating mirror module of the above-mentioned Patent Literature 1 is applied to a light receiving device (scanner mirror) in a ranging device, a problem is that the amount of received light reaching the photodetector (light receiving element) fluctuates greatly between the minimum and maximum values (there is a pronounced difference in the minimum and maximum values). It has been discovered that this is attributable to integral fluctuation in a state in which the two light receiving mirrors (reflectors) are substantially in a state of being a single reflecting face (light receiving face). Also, repeated fluctuation of the amount of light received at the photodetector (light receiving element) leads to fluctuation (variance) in the S/N ratio (signal-to-noise ratio) at the light receiving element. This causes inconsistent measurement accuracy of the ranging device.

One object is to provide a scanner mirror with which the fluctuation range in the amount of light received by a photodetector (the difference between the minimum and maximum amounts of light received) according to displacement of reflectors having light receiving faces will be less likely to become pronounced.

[1] In view of the state of the known technology and in accordance with an aspect of the present invention, a scanner mirror includes a reflecting mirror and a driver. The reflecting mirror has first and second reflectors that are pivotally arranged about a pivot axis. The first and second reflectors have light receiving faces, respectively. The light receiving faces face in directions that are angularly offset with each other about the pivot axis. The driver drives the reflecting mirror to pivot the first and second reflectors within a specific angle range.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

First, the configuration of a ranging device 100 with a scanner mirror 30 in accordance with the first embodiment will now be described through reference to FIGS. 1 to 5.

Configuration of Ranging Device

Figure 1:
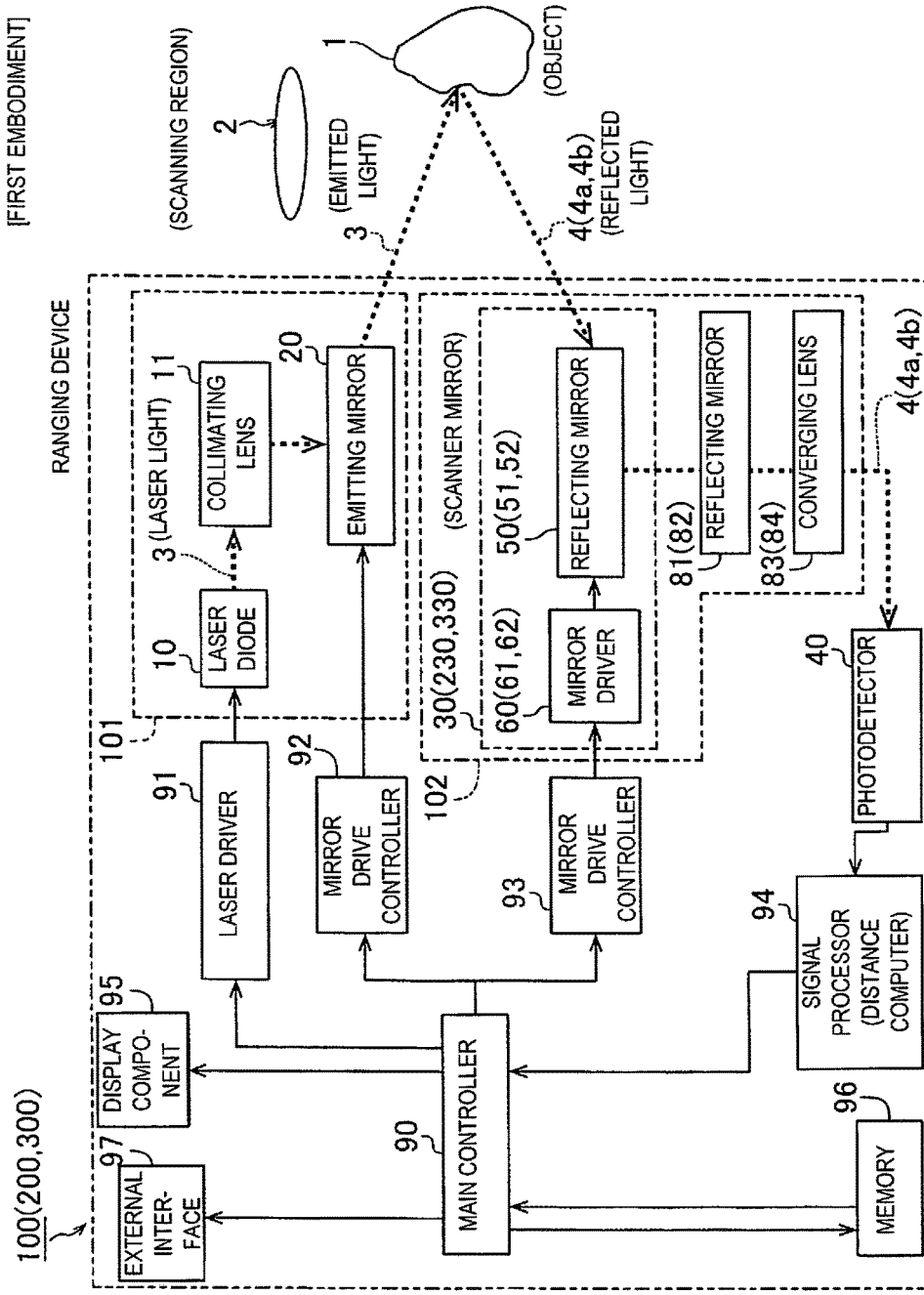
FIG. 1 is a block diagram of the configuration of a ranging device in accordance with a first embodiment.

As shown in FIG. 1, the ranging device 100 in accordance with the first embodiment has the function of finding the distance and direction of an object 1. Specifically, the ranging device 100 is a ranging device for measuring the distance to the object 1 based on how long it takes for laser light 3 emitted from the ranging device 100 to come back. In this case, the laser light 3 is two-dimensionally scanned over a specific angle range with respect to a scanning region 2 in front of the ranging device 100. The scanned laser light 3 is reflected by the object 1 and the ranging device 100 receives the reflected light 4, allowing the distance to the object 1 and the direction in which it is located to be sensed by the ranging device 100. The scanning region 2 is an example of the "specific region" of the present disclosure.

The ranging device 100 includes a laser diode 10, an emitting mirror 20, a scanner mirror 30 (within the two-dot chain line in FIG. 1), a photodetector 40, and a main controller 90. These constituent components are housed in a case (not shown). Also provided in the interior of the case (not shown) are an optical system 101 for emitting the laser light 3, and an optical system 102 for receiving the reflected light 4 (see FIG. 5 for details). The laser diode 10 is an example of the "light source" of the present disclosure. The emitting mirror 20 is an example of the "third reflector" of the present disclosure.

Description of Elements

The laser diode 10 has the function of emitting the laser light 3. The emitting mirror 20 forms the optical system 101 on the exit side. The emitting mirror 20 has the function of reflecting the laser light (exit light) 3 that has been emitted from the laser diode 10 and made into parallel light by a collimating lens 11. The emitting mirror 20 is configured to be pivoted by a mirror drive controller 92 such that the laser light 3 is emitted from the ranging device 100 while scanning the scanning region 2. The scanner mirror 30 (within the two-dot chain line in FIG. 1) has the function of receiving the reflected light 4 that has been reflected by the object 1 and reflecting (guiding) the reflected light 4 toward the photodetector 40. The scanner mirror 30 is configured as a single scanning device. The scanner mirror 30 includes a reflecting mirror 50 and a mirror driver 60. The photodetector 40 includes avalanche photodiodes, for example. The photodetector 40 has the function of actually receiving the reflected light 4 (reflected light 4a and reflected light 4b (discussed below) (see FIG. 5)) from the scanner mirror 30, and converting the reflected light 4 into an electrical signal. The mirror driver 60 is an example of the "driver" of the present disclosure.

The main controller 90 performs the comprehensive control processing of the ranging device 100. The ranging device 100 includes a laser driver 91, the mirror drive controller 92, a mirror drive controller 93, a signal processor (distance computer) 94, a display component (display) 95, a memory (storage device) 96, and an external interface 97. These constituent elements are configured to have their operation controlled based on commands from the main controller 90. The main controller 90 is an electric controller that includes a microcomputer (processor), for example.

The laser driver 91 drives the laser diode 10. The mirror drive controller 92 drives the emitting mirror 20. The mirror drive controller 93 drives the reflecting mirror 50 by driving an electromagnetic drive coil 62 (mirror driver 60) (discussed below). The signal processor (distance computer) 94 computes the distance and direction to the object 1 based on the electrical signal converted by the photodetector 40. The computation result from the signal processor 94 is displayed on the display component (display) 95. A control program executed by the main controller 90 and so forth are stored in a specific region within the memory 96. The memory 96 is used as a working memory that temporarily holds control parameters used in executing the control program. The external interface 97 is an interface with external devices (such as a PC) connected to the ranging device 100. The laser driver 91, the mirror drive controller 92, the mirror drive controller 93 each include electric circuits packaged as an integrated circuit, for example. The signal processor 94 is an electric controller that includes a microcomputer (processor), for example.

Detailed Configuration of Scanner Mirror

Figure 2:
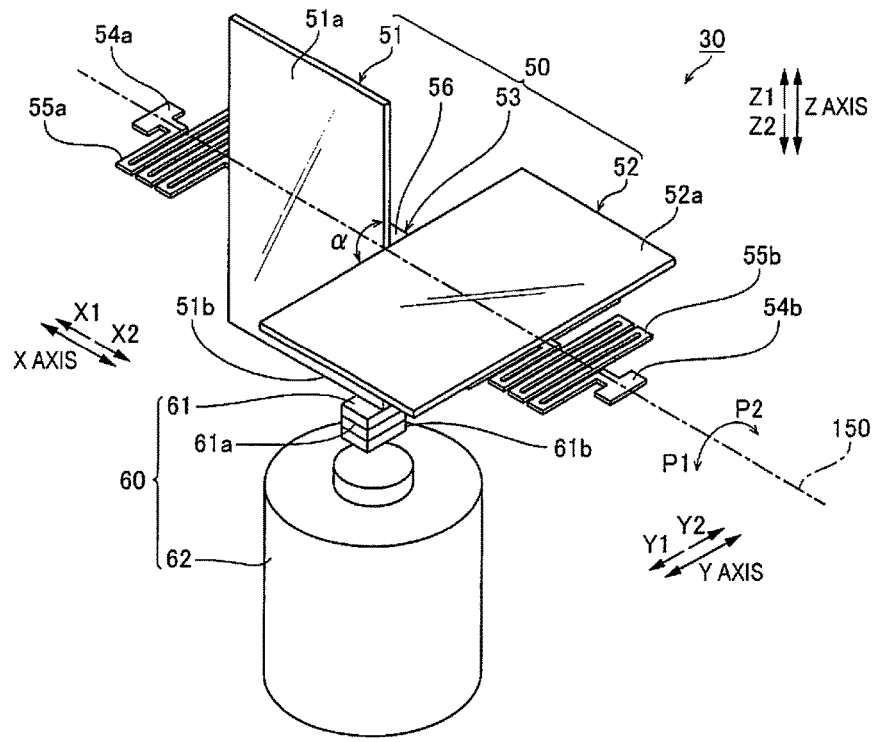
FIG. 2 is a perspective view of the overall configuration of a scanner mirror installed in a ranging device in accordance with the first embodiment.

As shown in FIG. 2, in the first embodiment, the reflecting mirror 50 includes a pair of light receiving mirrors 51 and 52, and a metal base part 53 formed by MEMS (micro-electro-mechanical system) technology. In the following description, the direction in which the base part 53 extends (the direction in which a pivot axis 150 extends; the pivot axis direction) is termed an X axis direction. Also, the direction in which the light receiving mirror 52 extends in FIG. 2 and that is perpendicular to the X axis direction is termed a Y axis direction. Furthermore, the direction that is perpendicular to both the X axis direction and the Y axis direction is termed a Z axis direction. The light receiving mirrors 51 and 52 are respectively examples of the "first reflector" and "second reflector" of the present disclosure. The base part 53 is an example of the "support" of the present disclosure. In the illustrated embodiment, FIG. 2 illustrates a neutral position or a non-operated or rest state of the scanner mirror 50, for example.

Figure 3:
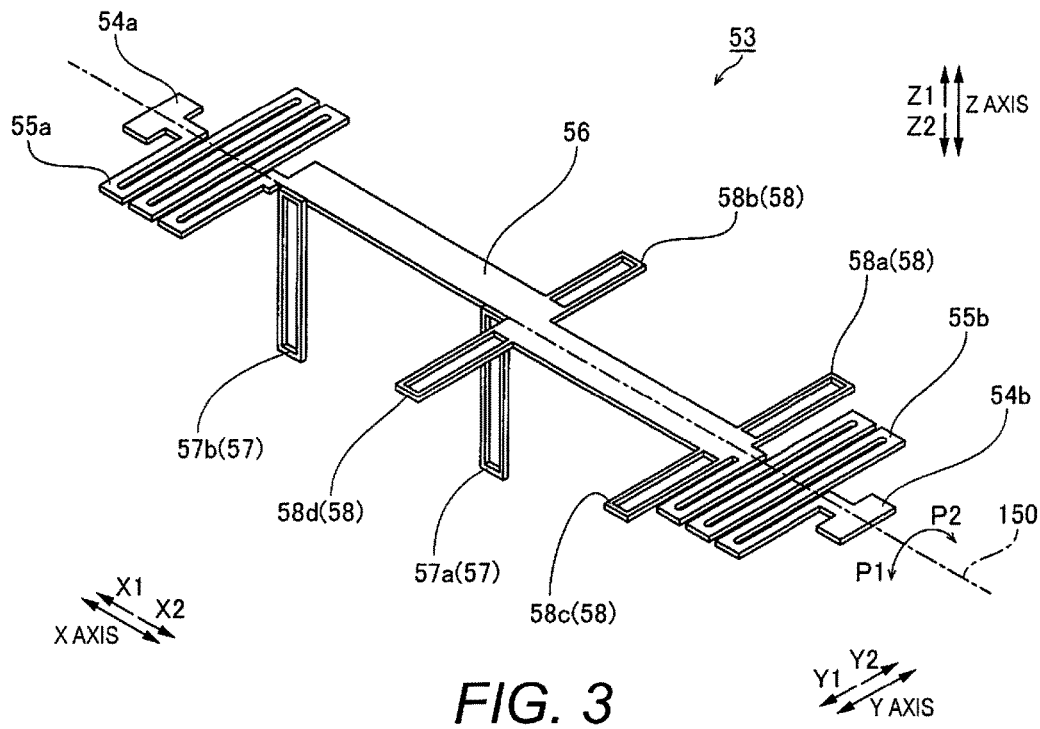
FIG. 3 is a perspective view of the detailed configuration of the scanner mirror installed in the ranging device in accordance with the first embodiment.

As shown in FIG. 3, the base part 53 has a pair of fixing parts 54a and 54b, and a pair of torsional parts 55a and 55b. Also, the base part 53 has a plate part 56. Also, the base part 53 has a support part 57 and a support part 58. The fixing part 54a is formed at an end of the base part 53 on the X1 side in the X axis direction. The fixing part 54b is formed at an end of the base part 53 on the X2 side in the X axis direction. The torsional part 55a is disposed between the fixing part 54a and the plate part 56. The torsional part 55a extends in the arrow X2 direction from the fixing part 54a while snaking back and forth in the arrow Y1 direction and the arrow Y2 direction along the Y axis direction. The torsional part 55b is disposed between the fixing part 54b and the plate part 56. The torsional part 55b extends in the arrow X1 direction from the fixing part 54b while snaking back and forth in the arrow Y1 direction and the arrow Y2 direction along the Y axis direction. The torsional parts 55a and 55b have meander structures, respectively. The torsional parts 55a and 55b are elastically deformable in the arrow Z1 direction and the arrow Z2 direction. The plate part 56 links an end portion of the torsional part 55a on the opposite side from the fixing part 54a (X2 side) and an end portion of the torsional part 55b on the opposite side from the fixing part 54b (X1 side) along the pivot axis 150. Also, the support part 57 supports the light receiving mirror 51 (see FIG. 2). The support part 58 supports the light receiving mirror 52 (see FIG. 2). The support part 57 has two arms 57a and 57b extending in parallel in the Z axis direction from the plate part 56. The support part 58 has four arms 58a to 58d extending in parallel in the Y axis direction from the plate part 56. In the illustrated embodiment, the arms 57a and 57b are extending in the same Y axis direction as the arms 58a to 58d during the formation of the base part 53, but after this, the connected portions (base portions) between the plate part 56 and the arms 57a and 57b are bend in the Z axis direction at an angle of about 90 degrees relative to the plate part 56. The fixing parts 54a and 54b are an example of the "end parts" of the present disclosure. The plate part 56 is an example of the "middle part" of the support of the present disclosure.

Figure 4:
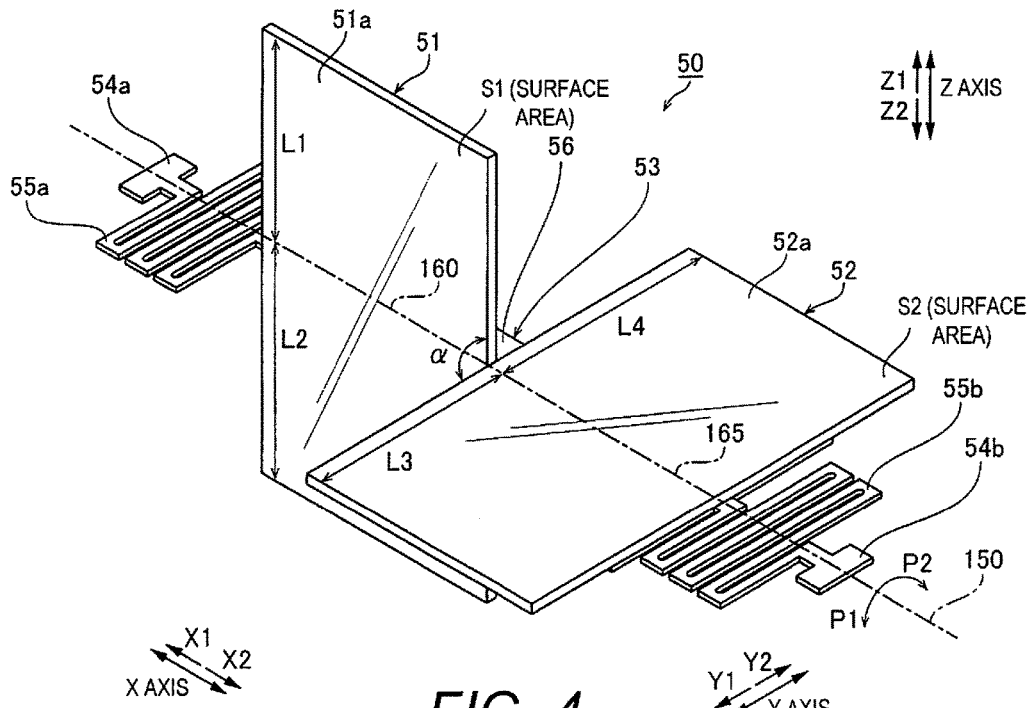
FIG. 4 is a perspective view of the detailed configuration of the scanner mirror installed in the ranging device in accordance with the first embodiment.

Consequently, as shown in FIG. 4, in the first embodiment, the rear face of the light receiving mirror 51 (the face on the Y2 side) is mounted to the support part 57 (the arms 57a and 57b) on the X1 side. The rear face of the light receiving mirror 52 (the lower face on the Z2 side) is mounted to the support part 58 (the arms 58a to 58d) on the X2 side. The light receiving mirrors 51 and 52 are produced by the vapor deposition of a reflective film on the surface of a thin sheet of glass. This vapor deposition of a reflective film results in the light receiving mirrors 51 and 52 having the light receiving faces 51a and 52a. Also, the light receiving face 51a of the light receiving mirror 51 and the light receiving face 52a of the light receiving mirror 52 are arranged in a relationship such that they intersect each other at an intersection angle α of approximately 90 degrees around the pivot axis 150. In the illustrated embodiment, the light receiving face 51a faces in the Y1 side along the Y axis direction, while the light receiving face 52a faces in the Z1 side along the Z axis direction, as shown in FIG. 2. The intersection angle α is an example of the "relative positional relationship" or "offset angle" of the present disclosure. In other words, the light receiving faces 51a and 52a are facing in directions that are angularly offset with respect to each other about the pivot axis 150. In the illustrated embodiment, the light receiving faces 51a and 52a are facing in directions that are angularly offset by about 90 degrees.

Also, the light receiving mirror 51 is supported by the base part 53 in a state in which its center line 160 in its width direction (the Z axis direction) that is perpendicular to the pivot axis 150 substantially coincides with the pivot axis 150. Similarly, the light receiving mirror 52 is supported by the base part 53 in a state in which its center line 165 in its width direction (the Y axis direction) that is perpendicular to the pivot axis 150 substantially coincides with the pivot axis 150. Therefore, the light receiving mirror 51 is arranged relative to the base part 53 such that the distance L1 from the pivot axis 150 to an edge of the light receiving mirror 51 on the Z1 side is approximately equal to the distance L2 from the pivot axis 150 to an edge (edge 51b in FIG. 2) of the light receiving mirror 51 on the Z2 side (L1=L2). Similarly, the light receiving mirror 52 is arranged relative to the base part 53 such that the distance L3 from the pivot axis 150 to an edge of the light receiving mirror 52 on the Y1 side is approximately equal to the distance L4 from the pivot axis 150 to an edge of the light receiving mirror 52 on the Y2 side (L3=L4). Also, the surface area S1 of the light receiving face 51a of the light receiving mirror 51 is approximately equal to the surface area S2 of the light receiving face 52a of the light receiving mirror 52 (S1=S2). Therefore, the light receiving mirror 51 and the light receiving mirror 52 have approximately the same size (light receiving surface area), shape, and thickness. In other words, the light receiving mirrors 51 and 52 are substantially identical to each other, expect for the directions in which they are attached to the base part 53. In the illustrated embodiment, the directions are different by about 90 degrees.

As shown in FIG. 2, the mirror driver 60 includes a permanent magnet 61 and the electromagnetic drive coil 62. The permanent magnet 61 is fixed to the edge 51b on the Z2 side of the light receiving mirror 51. The fixing position of the permanent magnet 61 in the X axis direction is all the way to the X2 side along the edge 51b (the side closest to the light receiving mirror 52). Therefore, the permanent magnet 61 is disposed at a location corresponding to the approximate X axis direction center of a region at which the light receiving mirrors 51 and 52 are fixed to the base part 53.

The electromagnetic drive coil 62 is disposed a specific distance away from the permanent magnet 61 in the arrow Z2 direction. One end 61a (Y1 side) of the permanent magnet 61 has an N pole, and the other end 61b (Y2 side) has an S pole. The polarity of the electromagnetic drive coil 62 is periodically switched at a specific frequency by the mirror drive controller 93 (see FIG. 1). With this configuration, the mirror driver 60 alternately switches at a specific frequency between a state in which the N pole side (one end 61a) of the permanent magnet 61 is attracted to the electromagnetic drive coil 62 and a state in which the S pole side (the other end 61b) of the permanent magnet 61 is attracted to the electromagnetic drive coil 62. With this configuration, the light receiving mirror 51 pivots in the arrow P1 direction and the arrow P2 direction. Also, the light receiving mirror 52 fixed (supported) on the base part 53 pivots in the arrow P1 direction and the arrow P2 direction along with the pivoting of the light receiving mirror 51.

In the illustrated embodiment, the torsional part 55a (55b) with the meander structure is provided between the fixing part 54a (54b) and the plate part 56. Thus, the light receiving mirror 51 and the light receiving mirror 52 integrally pivot around the pivot axis 150 in the arrow P1 direction and the arrow P2 direction. In this case, in the first embodiment, the light receiving mirrors 51 and 52 supported by the base part 53 are configured to pivot around the same (shared) pivot axis 150 in the arrow P1 direction and the arrow P2 direction in a state in which a specific intersection angle α between the light receiving faces 51a and 52a is maintained at a substantially constant value. In other words, the light receiving mirrors 51 and 52 are relatively immovable with respect to each other.

Figure 5:
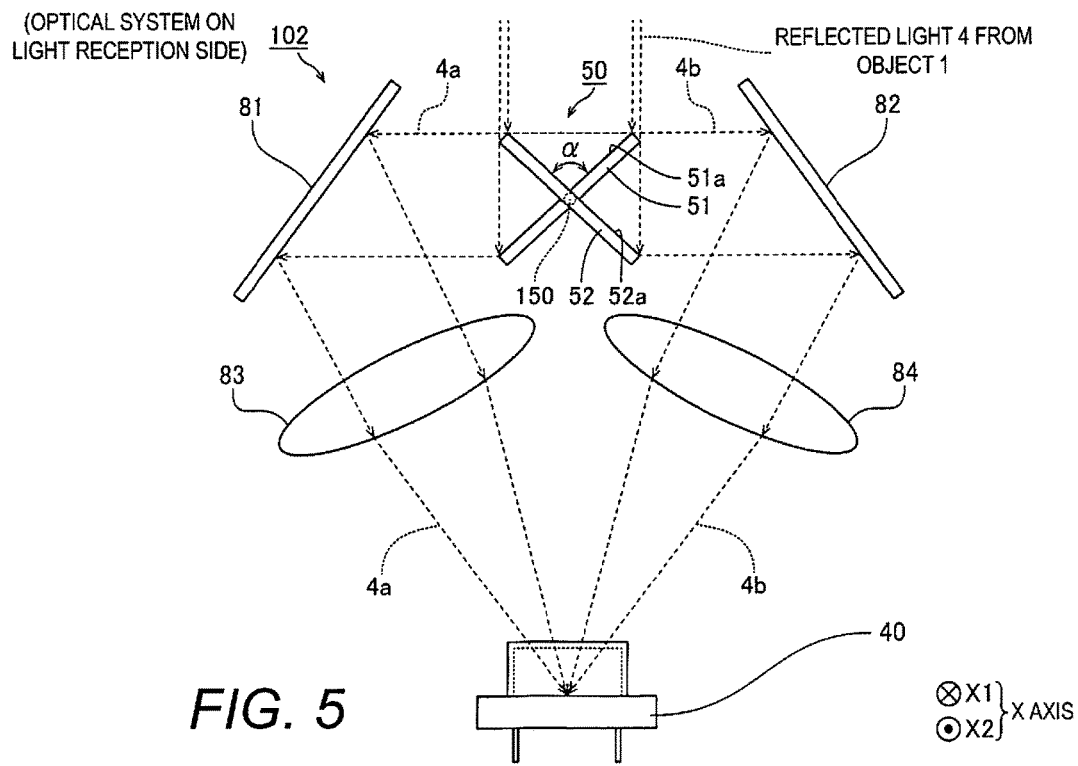
FIG. 5 is a diagram illustrating the optical system of the scanner mirror installed in the ranging device in accordance with the first embodiment.

As shown in FIG. 5, the optical system 102 on the light receiving side includes a pair of reflecting mirrors 81 and 82, and a pair of converging lenses 83 and 84. The reflecting mirrors 81 and 82 are fixedly and immovably provided in the ranging device 100. Also, the converging lenses 83 and 84 are fixedly and immovably provided in the ranging device 100. In the optical system 102, the reflecting mirrors 81 and 82 and the converging lenses 83 and 84 are disposed between the scanner mirror 30 and the photodetector 40. The reflecting mirror 81 reflects the reflected light 4a from the light receiving mirror 51 toward the single photodetector 40.

The role of the reflecting mirror 82 is to reflect the reflected light 4b from the light receiving mirror 52 toward the single photodetector 40. The converging lens 83 is disposed between the reflecting mirror 81 and the single photodetector 40. The converging lens 83 converges the reflected light 4a reflected by the reflecting mirror 81. The converging lens 84 is disposed between the reflecting mirror 82 and the single photodetector 40. The converging lens 84 converges the reflected light 4b reflected by the reflecting mirror 82. The reflected light 4a from the light receiving mirror 51 is then incident on the photodetector 40 via the reflecting mirror 81 and the converging lens 83, while the reflected light 4b from the light receiving mirror 52 is incident on the photodetector 40 via the reflecting mirror 82 and the converging lens 84.

Comparison with Comparison Example of Scanner Mirror

Figure 6:
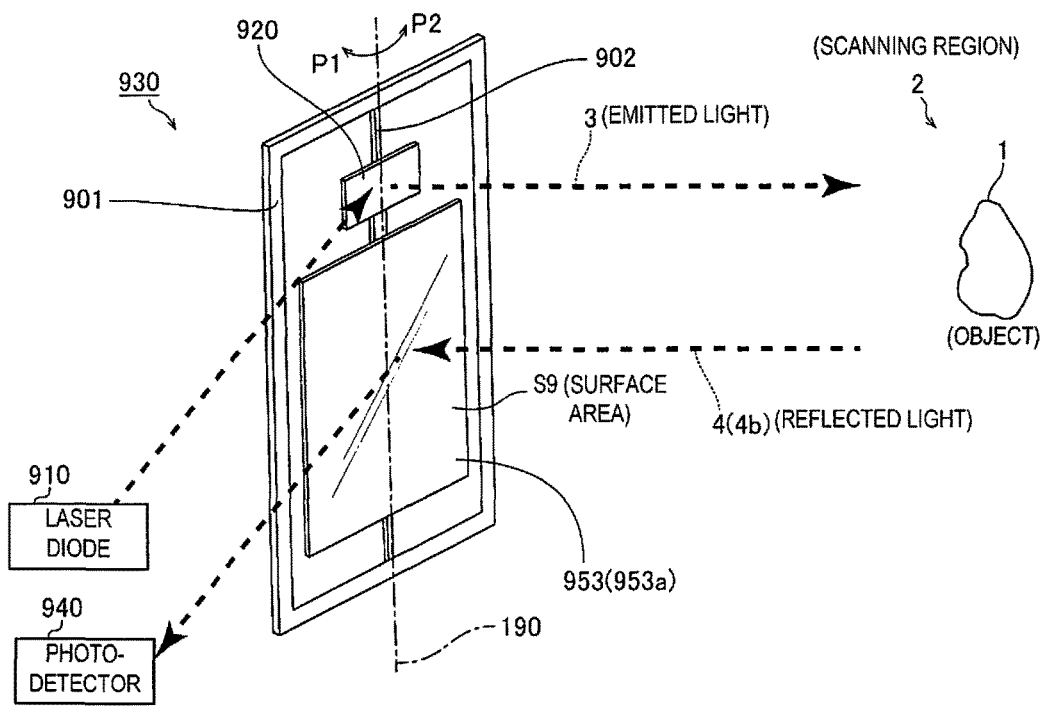
FIG. 6 shows the simplified configuration of a scanner mirror in a comparative example.

The advantages of applying the scanner mirror 30 in accordance with the first embodiment to the ranging device 100 will now be described through reference to FIG. 1 and FIGS. 5 to 9. Referring first to FIG. 6, the configuration of a scanner mirror 930 in accordance with a comparative example and the characteristics of the amount of light received by the scanner mirror 930 will be described. Then, the characteristics of the amount of light received by the scanner mirror 30 in accordance with the first embodiment will be described.

First, as shown in FIG. 6, the scanner mirror 930 in accordance with the comparative example has a single pivot shaft 902 formed on a frame-shaped support 901. An emitting mirror 920 is fixed on one side of the pivot shaft 902, and a single light receiving mirror 953 is fixed on the other side. A light blocker (not shown) can be also provided between the emitting mirror 920 and the light receiving mirror 953 in order to prevent mixing of the laser light 3 with the reflected light 4. However, in FIG. 6, the light blocker is omitted for the sake of brevity. The laser light 3 is emitted from a laser diode 910, and is emitted toward the scanning region 2 after being reflected by the emitting mirror 920. The reflected light 4 reflected by the object 1 is received (reflected) by the single light receiving mirror 953 and guided to a photodetector 940. The emitting mirror 920 and the light receiving mirror 953 pivot around a pivot axis 190 in the arrow P1 direction and the arrow P2 direction. In this case, they pivot over an angle range (an optical scanning angle) of "−45 degrees" to one side and "+45 degrees" to the other side with respect to an optical scanning angle center of "±0 degrees" (neutral position). If the optical scanning angle is "±45 degrees," then the mechanical scanning angle of the scanner mirror 930 is "±22.5 degrees, centered on 0 degrees.

Figure 7:
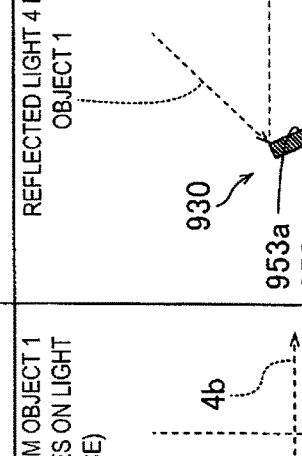
FIG. 7 is a simplified diagram illustrating the operational state of the scanner mirror in the comparative example.

The scanner mirror 930 installed in a ranging device in a comparative example (not shown) is pivoted as shown in FIG. 7. FIG. 7 here shows the scanner mirror 930 as seen in a direction along the pivot axis 190. The simplified diagram in the middle box in FIG. 7 shows an optical scanning angle of "±0 degrees," which corresponds to a state in which the reflected light 4 from the object 1 is incident at 45 degrees on the light receiving face 953a of the light receiving mirror 953. The simplified diagram in the left-hand box in FIG. 7 corresponds to an optical scanning angle of "−45 degrees." The simplified diagram in the right-hand box in FIG. 7 corresponds to an optical scanning angle of "+45 degrees."

In the following description, the amount of light received by the photodetector 940 in a state in which the optical scanning angle is "+45 degrees" (the right-hand box in FIG. 7) is set to a reference value (the amount of light received by the photodetector 940: 100%). In a state in which the optical scanning angle is "±0 degrees" (the middle box in FIG. 7), the light receiving mirror 953 is turned by 22.5 degrees in the counter-clockwise direction. In this case, the proportion of the effective light receiving surface area of the light receiving mirror 953 when viewed from the photodetector 940 (the proportion (percentage) of the projected surface area of the light receiving face 953a onto the photodetector 940) is approximately 77%. Therefore, the amount of light received by the photodetector 940 is also approximately 77% relative to the reference value. In a state in which the optical scanning angle is "−45 degrees" (the left-hand box in FIG. 7), the light receiving mirror 953 is turned by another 22.5 degrees in the counter-clockwise direction. In this case, the proportion (percentage) of the effective light receiving surface area of the light receiving mirror 953 when viewed from the photodetector 940 is approximately 41%. Therefore, the amount of light received by the photodetector 940 is also approximately 41% relative to the reference value.

Because of this, with the scanner mirror 930, which has only the single light receiving mirror 953, the amount of light received by the photodetector 940 fluctuates between approximately 41% and 100% while the optical scanning angle changes between −45 degrees and +45 degrees. Therefore, the amount of light received by the photodetector 940 fluctuates greatly, having a fluctuation range of approximately 59% between the minimum value (approximately 41%) and the maximum value (100%). This characteristic is shown as characteristic A (thick broken line) in FIG. 9.

Figure 8:
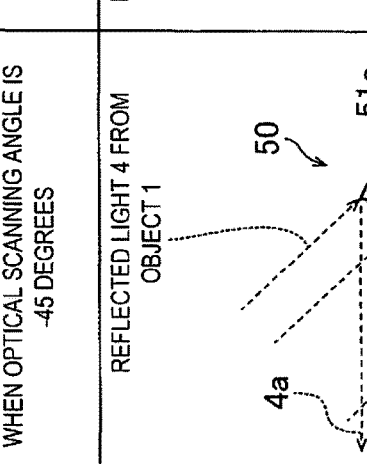
FIG. 8 is a simplified diagram illustrating the operational state of the scanner mirror installed in the ranging device in accordance with the first embodiment.

Meanwhile, as shown in FIG. 8, the scanner mirror 30 in accordance with the first embodiment includes the light receiving mirrors 51 and 52 that intersect each other at 90 degrees as viewed in the X axis direction. In the illustrated embodiment, the surface area S1 of the light receiving face 51a of the light receiving mirror 51 (see FIG. 4) and the surface area S2 of the light receiving face 52a of the light receiving mirror 52 (see FIG. 4) are each one half the surface area S9 of the light receiving face 953a of the light receiving mirror 953 in the comparative example (see FIG. 6). In other words, the scanner mirror 30 and the scanner mirror 930 has approximately the same light receiving surface area (S1+S2=S9). With this configuration, in a state in which the optical scanning angle is "±0 degrees" (the middle box in FIG. 8), the proportion of the effective light receiving surface area of the light receiving mirror 51 (the proportion (percentage) of the projected surface area of the light receiving face 51a onto the photodetector 40), and the proportion of the effective light receiving surface area of the light receiving mirror 52 (the proportion (percentage) of the projected surface area of the light receiving face 52a onto the photodetector 40) when viewed from the photodetector 40 are both approximately 77%. More specifically, the proportion of the projected surface area of the light receiving face 51a at the optical scanning angle of 0 degrees (the middle box in FIG. 8) relative to the effective light receiving surface area the projected surface area of the light receiving face 51a at the optical scanning angle of −45 degrees (the left-hand box in FIG. 8) becomes approximately 77%. Also, the proportion of the projected surface area of the light receiving face 52a at the optical scanning angle of 0 degrees (the middle box in FIG. 8) relative to the effective light receiving surface area the projected surface area of the light receiving face 52a at the optical scanning angle of +45 degrees (the right-hand box in FIG. 8) becomes approximately 77%. Thus, the amount of light received by the photodetector 40 is also approximately 77%. In a state in which the optical scanning angle is "+45 degrees" (the right-hand box in FIG. 8), the proportion of the effective light receiving surface area of the light receiving mirror 52 increases relatively, while the proportion of the effective light receiving surface area of the light receiving mirror 51 decreases relatively. As a result, the overall proportion of the effective light receiving surface area of the scanner mirror 30 as seen from the photodetector 40 is approximately 71%, and the amount of light received by the photodetector 40 is also approximately 71%. Also, in a state in which the optical scanning angle is "−45 degrees" (the left-hand box in FIG. 8), the proportion of the effective light receiving surface area of the light receiving mirror 52 decreases relatively, while the proportion of the effective light receiving surface area of the light receiving mirror 51 increases relatively. As a result, the overall proportion of the effective light receiving surface area of the scanner mirror 30 as seen from the photodetector 40 is approximately 71%, and the amount of light received by the photodetector 40 is also approximately 71%.

Because of this, with the scanner mirror 30, at an optical scanning angle between −45 and +45 degrees, the amount of light received by the photodetector 40 fluctuates between approximately 71% and 77%. Therefore, the amount of light received by the photodetector 40 fluctuates only slightly, having a fluctuation range of approximately 6% between the minimum value (approximately 71%) and the maximum value (approximately 77%). This characteristic is shown as characteristic G (thick solid line) in FIG. 9.

As mentioned above, with the scanner mirror 930 in the comparative example, the fluctuation range of the amount of light received by the photodetector 940 is approximately 59%. On the other hand, with the scanner mirror 30 in accordance with the first embodiment, the fluctuation range is greatly improved to approximately 6%. Also, with the scanner mirror 930, the minimum amount of light received is approximately 41%. On the other hand, with the scanner mirror 30, the minimum amount of light received is increased to approximately 71%, which is an increase of approximately 30%. Consequently, the amount of light received by the photodetector 40 when using the scanner mirror 30 in accordance with the first embodiment is kept to a fluctuation range of approximately 6%. Thus, variance in the S/N ratio (signal-to-noise ratio) at the photodetector 40 is also far lower than when using the scanner mirror 930.

In addition to the characteristics of the scanner mirror 930 and the scanner mirror 30 discussed above (characteristics A and G), FIG. 9 also shows the results of calculating the proportion of the effective light receiving surface area (the amount of light received by the photodetector 40) at various optical scanning angles when the intersection angle $a$ between the light receiving mirror 51 and the light receiving mirror 52 is varied from 15 degrees to 120 degrees in increments of 15 degrees.

Figure 9:
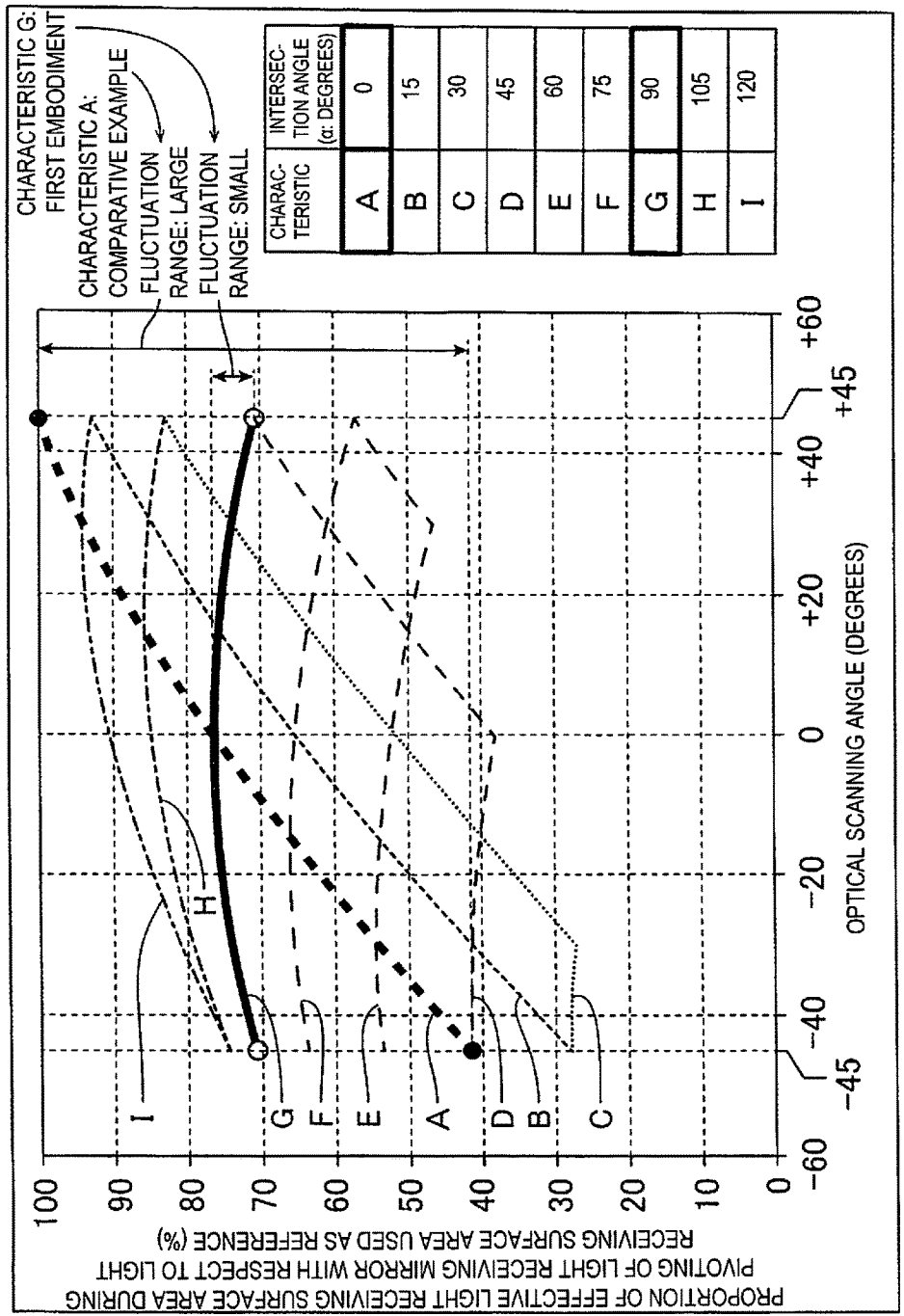
FIG. 9 is a diagram illustrating the effect of the scanner mirror installed in the ranging device in accordance with the first embodiment.

As shown in FIG. 9, with characteristic B (intersection angle α=15 degrees), characteristic C (intersection angle α=30 degrees), characteristic D (intersection angle α=45 degrees), characteristic E (intersection angle α=60 degrees), and characteristic F (intersection angle α=75 degrees), there is an overall tendency for the amount of light received by the photodetector 40 to decrease more than with the characteristic A (intersection angle α=90 degrees). Also, with characteristic H (intersection angle α=105 degrees) and characteristic I (intersection angle α=120 degrees), there is an overall increase the amount of light received by the photodetector 40 over that with characteristic A (intersection angle α=90 degrees). However, there is a tendency for the difference (fluctuation range) between the minimum and maximum values of the proportion of the effective light receiving surface area (amount of light received) over the optical scanning angle range (between −45 and +45 degrees) to be greater than the approximately 6% of characteristic A.

Therefore, it is preferable for the intersection angle α between the light receiving mirror 51 and the light receiving mirror 52 to be set to 90 degrees. However, if a permissible range is provided to the intersection angle α, then it is also preferable for the intersection angle α to be set to a range that is more than or equal to 75 degrees and less than or equal to 105 degrees (between characteristics F and H). In this case, it is more preferable for the intersection angle α to be set to a range that is more than or equal to 85 degrees and less than or equal to 95 degrees (a value in vicinity of characteristic G; ±5 degrees). The ranging device 100 with the scanner mirror 30 in accordance with the first embodiment is configured as mentioned above.

Effect of First Embodiment

The following effect can be obtained in the first embodiment.

In the first embodiment, as discussed above, the scanner mirror 30 includes the reflecting mirror 50 and the mirror driver 60. The reflecting mirror 50 has the light receiving mirrors 51 and 52 (e.g., the first and second reflectors) that are pivotally arranged about the pivot axis 150. The light receiving mirrors 51 and 52 have the light receiving faces 51a and 52a, respectively. The light receiving faces 51a and 52a face in the directions (the Y1 side of the Y axis direction and the Z1 side of the Z axis direction) that are angularly offset with each other about the pivot axis 150. The mirror driver 60 is configured to drive the reflecting mirror 50 to pivot the light receiving mirrors 51 and 52 within the specific angle range. In particular, there are provided the light receiving mirrors 51 and 52 each receive the reflected light 4 from the object 1 in a state in which the light receiving faces 51a and 52a have a relative positional relationship (e.g., the intersection angle α) and are arranged at the intersection angle α to each other around the pivot axis 150. Consequently, the light receiving mirrors 51 and 52 pivot around the same (shared) pivot axis 150 in a state of having the intersection angle α between the light receiving faces 51a and 52a. Thus, in a single scan of the reflected light 4, even if there is a decrease in the effective light receiving surface area of either of the light receiving mirrors 51 and 52 as seen from the photodetector 40 (such as the projected surface area of the light receiving mirror 51 onto the photodetector 40), and a decrease in the amount of light guided to and received by the photodetector 40, there will be an increase in the light receiving surface area of the other of the light receiving mirrors 51 and 52 (such as the projected surface area of the light receiving mirror 52 onto the photodetector 40). This allows the amount of reflected light guided to and received by the photodetector 40 to be increased.

Therefore, compared to when reflected light is received and converged on a photodetector by a light receiving mirror having a single light receiving face or two light receiving mirrors whose light receiving faces are aligned in the same plane, the variation width (fluctuation range) in the total amount of reflected light that is guided to and received by the photodetector 40 via the light receiving mirrors 51 and 52 disposed such that their light receiving faces 51a and 52a are at the intersection angle α to each other can be reduced. As a result, it is less likely that the fluctuation range in the amount of light received by the photodetector 40 (the difference between the minimum and maximum amounts of light received) according to displacement of the light receiving mirrors (the light receiving mirrors 51 and 52) will be pronounced. Also, reducing the fluctuation range of the amount of light received by the photodetector 40 (equalizing the amount of light received by the photodetector 40 over the pivot angle range (optical scanning angle) of the light receiving mirrors 51 and 52) causes variance in the S/N ratio (signal-to-noise ratio) at the photodetector 40 to reduce. Consequently, measurement error in the photodetector 40 can be made more uniform, regardless of the pivot angle range (optical scanning angle) of the light receiving mirrors 51 and 52. Also, the ranging device 100 that exhibits this effect can be easily obtained.

Also, in the first embodiment, the light receiving mirrors 51 and 52 pivot together while substantially maintaining the intersection angle α (e.g., the offset angle) between the light receiving faces 51a and 52a about the pivot axis 150. In particular, the light receiving mirrors 51 and 52 pivot in a state in which the specific intersection angle α between the light receiving faces 51a and 52a is maintained at approximately 90 degrees (a substantially constant value). In other words, the light receiving mirrors 51 and 52 pivot integrally in a state in which the intersection angle α is maintained at a substantially constant value (approximately 90 degrees). Thus, the fluctuation range of the total amount of reflected lights 4a and 4b guided to and received by the photodetector 40 via the light receiving mirrors 51 and 52 can be maintained at a substantially constant value.

Also, in the first embodiment, the light receiving mirrors 51 and 52 are arranged with respect to each other such that the intersection angle α is more than or equal to 75 degrees and less than or equal to 105 degrees. In particular, the intersection angle α is set to more than or equal to 75 degrees and less than or equal to 105 degrees. Consequently, the fluctuation range of the amount of light received by the photodetector 40 (the difference between the minimum and maximum amounts of light received) according to displacement of the light receiving mirrors 51 and 52 in a single scan of reflected light 4 can be reliably prevented from becoming pronounced. This effect has been described in the "Comparison with Comparison Example of Scanner Mirror" section above. Specifically, as shown in FIG. 9, the intersection angle α formed by the light receiving mirrors 51 and 52 is preferably more than or equal to 75 degrees and less than or equal to 105 degrees (between characteristic F and characteristic H), at which the amount of light received is relatively large and the fluctuation range is relatively low.

Also, in the first embodiment, the light receiving mirrors 51 and 52 are arranged with respect to each other such that the intersection angle α is more than or equal to 85 degrees and less than or equal to 95 degrees. In particular, the intersection angle α is set to more than or equal to 85 degrees and less than or equal to 95 degrees. Consequently, the fluctuation range of the amount of light received by the photodetector 40 (the difference between the minimum and maximum amounts of light received) according to displacement of the light receiving mirrors 51 and 52 in a single scan of reflected light 4 can be effectively prevented from becoming pronounced. This effect has been described in the "Comparison with Comparison Example of Scanner Mirror" section above. Specifically, as shown in FIG. 9, the intersection angle α formed by the light receiving mirrors 51 and 52 is most preferably 90 degrees (characteristic G), at which the fluctuation range is smallest. Thus, in the illustrated embodiment, the light receiving mirrors 51 and 52 are arranged with respect to each other such that the intersection angle α is 90 degrees. Also, the intersection angle α can be set to be more than or equal to 85 degrees and less than or equal to 95 degrees, which is in vicinity (within a range of ±5 degrees) of 90 degrees. In this case, the fluctuation range (the difference between the minimum and maximum amounts of light received) can be effectively reduced.

Also, in the first embodiment, the light receiving faces 51a and 52a of the light receiving mirrors 51 and 52 have the surface areas S1 and S2 that are substantially equal to each other. For example, the surface area S1 of the light receiving face 51a of the light receiving mirror 51 is approximately equal to the surface area S2 of the light receiving face 52a of the light receiving mirror 52. Consequently, the characteristic of the amount of light reflected by the light receiving mirror 51 (the characteristic of the change in the effective light receiving surface area accompanying displacement of the light receiving mirror 51 as seen from the photodetector 40) can be made approximately equal to the characteristic of the amount of light reflected by the light receiving mirror 52 (the characteristic of the change in the effective light receiving surface area accompanying displacement of the light receiving mirror 52 as seen from the photodetector 40). This effectively results in that when the amount of light reflected by either of the light receiving mirrors 51 and 52 is decreased, the amount of light reflected by the other one is increased. Thus, the amounts of the reflected lights 4a and 4b that are guided to and received by the photodetector 40 can be effectively complemented with each other, and the total amount of the reflected light 4 can be maintained.

Also, in the first embodiment, the light receiving mirrors 51 and 52 are substantially identical to each other.

Also, in the first embodiment, the reflecting mirror 50 further has the base part 53 (e.g., the support) that pivotally supports the light receiving mirrors 51 and 52 about the pivot axis 150.

Also, in the first embodiment, the base part 53 includes the pair of the fixing parts 54a and 54b (e.g., the end parts), the plate part 56 (e.g., the middle part) that is disposed between the fixing parts 54a and 54b and to which the light receiving mirrors 51 and 52 are attached, and the pair of the torsional parts 55a and 55b disposed between the plate part 54 and the fixing parts 54a and 54b, respectively.

Also, in the first embodiment, the torsional parts 55a and 55b each have the meander structure.

Specifically, in the first embodiment, the scanner mirror 30 includes the base part 53 (plate part 56) that supports the light receiving mirrors 51 and 52, the fixing parts 54a and 54b, and the torsional parts 55a and 55b. The torsional parts 55a and 55b have the meander structures and are located between the plate part 56 and the fixing parts 54a and 54b. Consequently, the plate part 56 can be easily pivoted with respect to the fixing parts 54a and 54b by means of the torsional parts 55a and 55b that have the meander structures. As a result, the light receiving mirrors 51 and 52 supported by the plate part 56 can be pivoted over a specific angle range in a state of having the intersection angle α.

Also, in the first embodiment, the specific angle range is 45 degrees.

Also, in the first embodiment, the ranging device 100 includes the laser diode 10 (e.g., the light source), the scanner mirror 30, and the photodetector 40 (e.g., the light receiver). The scanner mirror 30 is configured to reflect the reflected light 4 that has been emitted from the laser diode 10 and reflected by the object 1. The photodetector 40 is configured to receive the reflected light 4 from the scanner mirror 30.

Also, in the first embodiment, the ranging device 100 further includes the pair of the reflecting mirrors 81 and 82 configured to reflect the reflected light 4 from the scanner mirror 30 towards the photodetector 40.

Also, in the first embodiment, the reflecting mirrors 81 and 82 are configured to reflect the reflected lights 4a and 4b that have been reflected on the light receiving mirrors 51 and 52, respectively.

Second Embodiment

A second embodiment will now be described through reference to FIGS. 1, 2, and 10. In the second embodiment, an emitting mirror 59 is fixed (supported) on a base part 253 to form a scanner mirror 230. In the drawings, those components that are the same as in the first embodiment above will be numbered the same.

Figure 10:
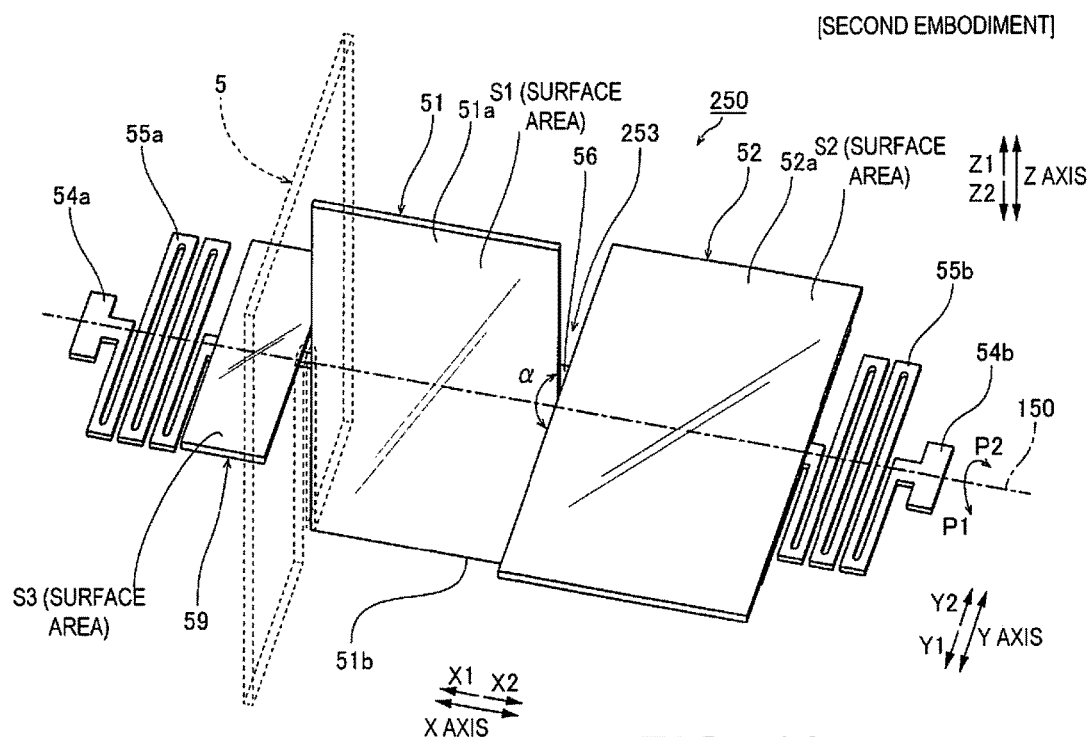
FIG. 10 is a perspective view of the configuration of a scanner mirror installed in a ranging device in accordance with a second embodiment.

A ranging device 200 in accordance with the second embodiment (see FIG. 1) includes the scanner mirror 230 as shown in FIG. 10. The scanner mirror 230 includes a reflecting mirror 250 and a mirror driver 60 (see FIG. 1). In the scanner mirror 230, the emitting mirror 59, the light receiving mirror 51, and the light receiving mirror 52 are fixed to the base part 253. In this case, the emitting mirror 59, the light receiving mirror 51, and the light receiving mirror 52 are disposed in this order on the base part 253, from one side (the X1 side) to the other side (the X2 side), along the same (shared) pivot axis 150. The base part 253 is an example of the "support" of the present disclosure. The emitting mirror 59 is an example of the "third reflector" of the present disclosure.

Also, in the second embodiment, a reflecting face 59a of the emitting mirror 59 is located within an angle range between the light receiving face 51a of the light receiving mirror 51 and the light receiving face 52a of the light receiving mirror 52, which intersect at an intersection angle α (approximately 90 degrees in the illustrated embodiment). In this case, the reflecting face 59a of the emitting mirror 59 is aligned in substantially the same plane as the light receiving face 52a of the light receiving mirror 52. Also, the surface areas S1 and S2 of the light receiving faces 51a and 52a of the light receiving mirrors 51 and 52, respectively, are greater than the surface area S3 of the reflecting face 59a of the emitting mirror 59 (S1=S2>S3). The emitting mirror 59, the light receiving mirror 51, and the light receiving mirror 52 are pivoted integrally in the arrow P1 direction and the arrow P2 direction around the pivot axis 150. A light blocker 5 (shown by the broken line in FIG. 10) is provided for preventing the laser light 3 emitted from the emitting mirror 59 from coming around into the light receiving mirrors 51 and 52. The light blocker 5 is provided between the emitting mirror 59 and the light receiving mirror 51 in the scanner mirror 230. The rest of the configuration of the ranging device 200 in the second embodiment is the same as in the first embodiment above.

Effect of Second Embodiment

In the second embodiment, as discussed above, the scanner mirror 230 further includes the emitting mirror 59 (e.g., the third reflector) configured to reflect the laser light 3 from the laser diode 10 (e.g., the light source). The emitting mirror 59 is pivotally arranged about the pivot axis 150. Specifically, the emitting mirror 59 is provided to the scanner mirror 230 to reflect the laser light 3 coming from the laser diode 10 that emits the light, toward the scanning region 2. The emitting mirror 59 is supported by the base part 253. Consequently, the base part 253 on which the light receiving mirrors 51 and 52 are supported (fixed) can be utilized to pivot the emitting mirror 59. Therefore, unlike when a separate pivot shaft is provided for the emitting mirror 59, the base part 253 can also serve as the pivot shaft for the emitting mirror 59. This avoids an increase in the number of parts in the ranging device 200 in which the scanner mirror 230 is installed. Also, the emitting mirror 59 can be pivoted in synchronization with the pivoting of the light receiving mirrors 51 and 52, unlike when a separate pivot shaft is provided for the emitting mirror 59. Thus, the configuration of the ranging device 200 in which the scanner mirror 230 is installed can be simplified.

Also, in the second embodiment, the emitting mirror 59 is disposed between the light receiving mirror 51 (e.g., the first reflector) and the light receiving mirror 52 (e.g., the second reflector) along the pivot axis 150. Specifically, the scanner mirror 230 is configured such that the emitting mirror 59, the light receiving mirror 51, and the light receiving mirror 52 are disposed in this order on the base part 253, from one side (the X1 side) to the other side (the X2 side), along the same (shared) pivot axis 150. Consequently, with the ranging device 200 in which the scanner mirror 230 is installed, the optical system 101 on the exit light side including the emitting mirror 59 (see FIG. 1), and the optical system 102 on the reflected light side including the light receiving mirrors 51 and 52 (see FIG. 1) can be disposed separate from each other. Thus, the optical design within the ranging device 200 can be easily adjusted.

Also, in the second embodiment, the light receiving faces 51a and 52a of the light receiving mirrors 51 and 52 have the surface areas S1 and S2 that are greater than the surface area S3 of the reflecting face 59a of the the emitting mirror 59. Specifically, the surface areas S1 and S2 of the light receiving faces 51a and 52a of the light receiving mirrors 51 and 52 are greater than the surface area S3 of the reflecting face 59a of the emitting mirror 59. Consequently, the reflected light 4 (4a and 4b) reflected from the object 1 located in the scanning region 2 can be received more reliably by the light receiving mirrors 51 and 52, and can be reflected toward (guided to) the photodetector 40 more reliably. The rest of the effect of the second embodiment is the same as that of the first embodiment above.

Also, in the second embodiment, the emitting mirror 59 has the reflecting face 59a that faces in the direction that is substantially parallel to the direction (the Z1 side of the Z axis direction) in which the light receiving face 52a of the light receiving mirror 52 faces.

Also, in the second embodiment, the scanner mirror 230 further includes the light blocker 5 disposed between the emitting mirror 59 and the light receiving mirror 51 (e.g., one of the first and second reflectors) along the pivot axis 150.

Third Embodiment

A third embodiment will now be described through reference to FIGS. 1, 2, 10, and 11. In the third embodiment, the emitting mirror 59 is disposed between the light receiving mirror 51 and the light receiving mirror 52 to form a scanner mirror 330. In the drawings, those components that are the same as in the first embodiment above will be numbered the same.

Figure 11:
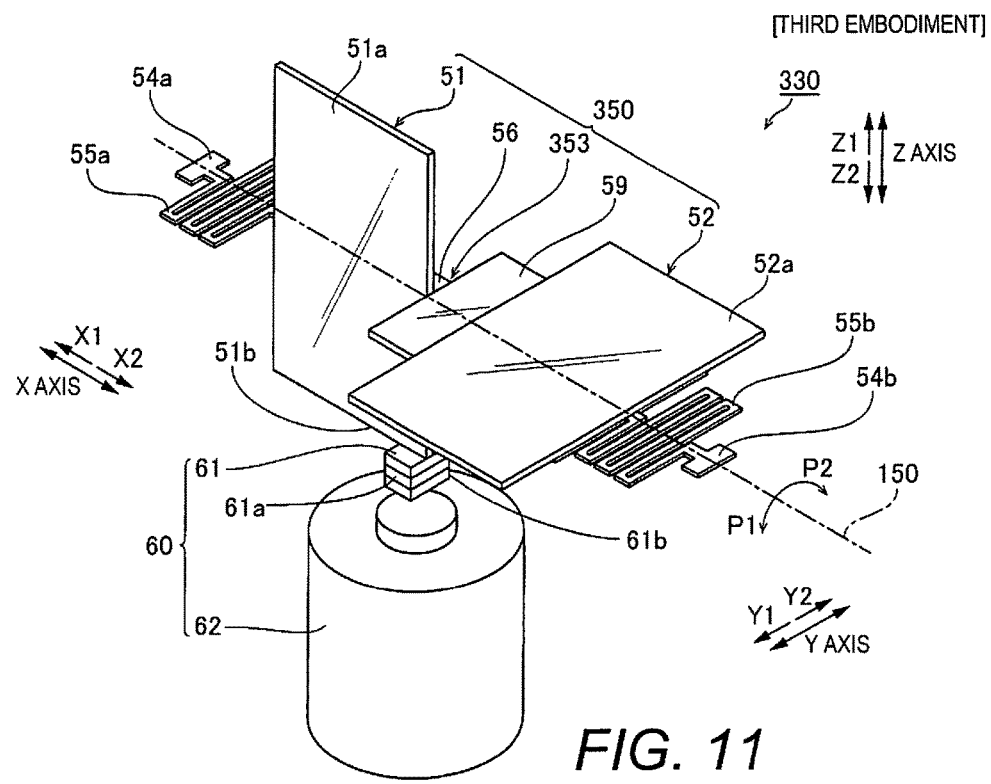
FIG. 11 is a perspective view of the configuration of a scanner mirror installed in a ranging device in accordance with a third embodiment.

A ranging device 300 in accordance with the third embodiment (see FIG. 1) includes the scanner mirror 330 as shown in FIG. 11. Also, the scanner mirror 330 includes a reflecting mirror 350 and a mirror driver 60. In the scanner mirror 330, the light receiving mirror 51, the emitting mirror 59, and the light receiving mirror 52 are disposed in this order on the base part 353, from one side (the X1 side) to the other side (the X2 side), along the same (shared) pivot axis 150. Specifically, the emitting mirror 59 is disposed between the light receiving mirror 51 and the light receiving mirror 52. The base part 353 is an example of the "support" of the present disclosure.

Consequently, the ranging device 300 is configured such that the optical axis of the laser light 3 (see FIG. 1) emitted from the emitting mirror 59 toward the scanning region 2 (see FIG. 1) including the object 1 (see FIG. 1) can be brought as close as possible to the reflection optical axis (light reception optical axis) of the reflected light 4 (4a and 4b) (see FIG. 1) reflected from the object 1 located in the scanning region 2. The light receiving mirror 51, the emitting mirror 59, and the light receiving mirror 52 are integrally pivoted in the arrow P1 direction and the arrow P2 direction around the pivot axis 150. A pair of light blockers (not shown) for preventing the laser light 3 emitted from the emitting mirror 59 from coming around into the light receiving mirrors 51 and 52 is provided between the light receiving mirror 51 and the emitting mirror 59, and between the emitting mirror 59 and the light receiving mirror 52 in the scanner mirror 330. These light blockers have the same configuration as the light blocker 5 (see FIG. 10) described in the second embodiment above. In FIG. 11, these light blockers are not depicted in order to clearly illustrate the configuration of the scanner mirror 330 in FIG. 11. The rest of the configuration of the ranging device 300 in the third embodiment is the same as in the second embodiment above.

Effect of the Third Embodiment

In the third embodiment, as discussed above, the light receiving mirror 51 (e.g., the first reflector) is disposed between the light emitting mirror 59 (e.g., the third reflector) and the light receiving mirror 52 (e.g., the second reflector) along the pivot axis 150. Specifically, the scanner mirror 330 is configured such that the light receiving mirror 51, the emitting mirror 59, and the light receiving mirror 52 are disposed in this order on the base part 353, from one side (the X1 side) to the other side (the X2 side), along the same (shared) pivot axis 150. Consequently, the emitting mirror 59 is disposed between the light receiving mirror 51 and the light receiving mirror 52. Thus, the optical axis of the laser light 3 (see FIG. 1) emitted from the emitting mirror 59 toward the scanning region 2 (see FIG. 1) including the object 1 (see FIG. 1) can be brought as close as possible to the reflection optical axis (the optical axis of the reflected light 4a and the reflected light 4b) of the reflected light 4 (4a and 4b) reflected from the object 1 located in the scanning region 2 (see FIG. 1). Therefore, parallax can be lessened. Thus, even if the distance to the object 1 is relatively short, the ranging device 300 will still be able to accurately measure the distance to that object 1. The rest of the effect of the third embodiment is the same as in the second embodiment above.

Modification Examples

The embodiments disclosed herein are in all respects nothing more than examples, and should not be interpreted as limiting in nature. The scope of the present invention is as indicated by the claims, rather than by the above description of embodiments. Furthermore, all modifications (modification examples) within the meaning and range of equivalency of the claims are included.

For example, in the first to third embodiments above, the laser diode 10 is an example of the "light source" of the present disclosure. However, the present invention is not limited to this. For instance, the optical system 101 can be configured such that LEDs (light emitting diodes) are used as the "light source." In this case, the LED light is diffused into the scanning region 2 by a lenticular lens, instead of using the pivoting emitting mirrors 20 and 59. The lenticular lens is formed by lining up a plurality of long, slender, half-round convex lenses (cylindrical lenses) in a sheet form. In this case, the ranging device can be configured such that when the reflected light 4 reflected by the object 1 (out of the diffused light) is received, the scanner mirror 30 in which the light receiving mirrors 51 and 52 integrally pivot is used to receive the reflected light 4. Again with this configuration, the amount of light received by the photodetector 40 over the pivot angle range (optical scanning angle) of the light receiving mirrors 51 and 52 can be equalized, and measurement error in the photodetector 40 can be made more uniform, regardless of the pivot angle range (optical scanning angle) of the light receiving mirrors 51 and 52.

Also, in the first to third embodiments above, the mirror driver 60 is formed by the permanent magnet 61 and the electromagnetic drive coil 62 that pivots the permanent magnet 61 with electromagnetic force. However, the present invention is not limited to this. For example, piezoelectrics can be incorporated into the portions of the torsional parts 55a and 55b having meander structures in the base part 53. The piezoelectrics can be piezoelectric elements that expand or contract the Z1 or Z2 side thereof in the Z axis direction according to the polarity when voltage is applied. In this case, the scanner mirror 30 (230, 330) can be configured so that when voltage controlled to a specific pattern is applied to the piezoelectrics, the light receiving mirrors 51 and 52 supported by the base part 53 are pivoted over a specific angle range.

Also, in the first to third embodiments above, the light receiving face 51a of the light receiving mirror 51 and the light receiving face 52a of the light receiving mirror 52 intersect each other at approximately 90 degrees around the pivot axis 150. However, the present invention is not limited to this. Specifically, as is clear from the characteristics of the amount of light received (calculation results) shown in FIG. 9, the intersection angle α between the light receiving face 51a and the light receiving face 52a can be more than or equal to 75 degrees and less than or equal to 105 degrees. Also, it is preferably more than or equal to 85 degrees and less than or equal to 95 degrees. If the intersection angle α between the light receiving face 51a and the light receiving face 52a is within this angle range, the effect of the present invention can be fully obtained.

Also, in the second and third embodiments above, the scanner mirror 230 (330) is configured such that the reflecting face 59a of the emitting mirror 59 and the light receiving face 52a of the light receiving mirror 52 are aligned in substantially the same plane. However, the present invention is not limited to this. As long as the reflecting face 59a faces in a direction between the light receiving face 51a and the light receiving face 52a that intersect each other at the intersection angle α (90 degrees) (as long as it is within an angle range between the light receiving face 51a and the light receiving face 52a), the reflecting face 59a of the emitting mirror 59 need not be aligned in substantially the same plane as the light receiving face 51a and the light receiving face 52a.

Also, in the first to third embodiments above, the present invention is applied to the scanner mirror 30 (230, 330) in which the optical scanning angle is set to "±45 degrees" (a mechanical scanning angle of ±22.5 degrees). However, the present invention is not limited to this. The present invention can also be applied to a scanner mirror in which the mechanical scanning angle is set to something other than ±22.5 degrees.

Also, in the first to third embodiments above, the light receiving mirrors 51 and 52 are examples of the "first reflector" and "second reflector" of the present disclosure, and the emitting mirrors 20 and 59 are examples of the "third reflector." However, the present invention is not limited to this. Specifically, the first to third reflectors can be formed by a reflector other than a "mirror."

[1] In view of the state of the known technology and in accordance with an aspect of the present invention, a scanner mirror includes a reflecting mirror and a driver. The reflecting mirror has first and second reflectors that are pivotally arranged about a pivot axis. The first and second reflectors have light receiving faces, respectively. The light receiving faces face in directions that are angularly offset with each other about the pivot axis. The driver is configured to drive the reflecting mirror to pivot the first and second reflectors within a specific angle range. For example, the light receiving faces have a relative positional relationship. The first and second reflectors are disposed on the same pivot axis.

As mentioned above, the scanner mirror in accordance with this aspect includes the first and second reflectors whose light receiving faces have the relative positional relationship and that are disposed on the same pivot axis. Consequently, the first and second reflectors are pivoted around the same (a shared) pivot axis in a state of having the relative positional relationship between their light receiving faces (such as a state of having a specific intersection angle or offset angle). Thus, in a single scan of a reflected light, even if the effective light receiving surface area of either the first reflector or the second reflector as seen from a photodetector (e.g., the projected surface area of the first reflector with respect to the photodetector) decreases, and the amount of reflected light that is guided to and received by the photodetector decreases, the effective light receiving surface area of the other reflector (either the first reflector or the second reflector) (e.g., the projected surface area of the second reflector with respect to the photodetector) will increase. This allows an increase in the amount of light that is guided to and received by the photodetector.

Therefore, compared to when reflected light is received by a reflector having a single light receiving face or by two reflectors whose light receiving faces are aligned in the same plane, and the light is converged on a photodetector, there will be a reduction in the variation width (fluctuation range) in the total reception amount of reflected light guided to a photodetector via the first and second reflectors disposed such that the light receiving faces have the relative positional relationship. As a result, it is less likely that the fluctuation range of the amount of light received by the photodetector (the difference in the minimum and maximum amounts of received light) according to displacement of the first and second reflectors will become pronounced. Also, reducing the fluctuation range in the amount of light received by the photodetector (equalizing the amount of light received by the photodetector over the pivot angle range of the first and second reflectors) causes variance in the S/N ratio (signal-to-noise ratio) at the photodetector to reduce. Consequently, measurement error in the photodetector can be made more uniform, regardless of the pivot angle range (scan angle) of the first and second reflectors.

[2] In accordance with a preferred embodiment according to the scanner mirror mentioned above, the first and second reflectors pivot together while substantially maintaining an offset angle between the light receiving faces about the pivot axis. For example, the first and second reflectors are configured to be pivoted in a state in which the relative positional relationship is held substantially constant. With this configuration, the first and second reflectors are pivoted integrally in a state in which the relative positional relationship (such as the intersection angle) is held substantially constant. Thus, the fluctuation range of the total amount of reflected light that is guided to and received by the photodetector via the first and second reflectors can be held to a substantially constant value.

[3] In accordance with a preferred embodiment according to any one of the scanner mirrors mentioned above, the first and second reflectors are arranged with respect to each other such that the offset angle is more than or equal to 75 degrees and less than or equal to 105 degrees. For example, the relative positional relationship is such that the offset angle formed by the light receiving face of the first reflector and the light receiving face of the second reflector is more than or equal to 75 degrees and less than or equal to 105 degrees. With this configuration, the fluctuation range in the amount of light received by the photodetector (the difference between the minimum and maximum amounts of light received) according to displacement of the first reflector and the second reflector in a single scan of the reflected light can be reliably prevented from becoming pronounced. This effect will be described in the "Comparison with Comparison Example of Scanner Mirror" section below. Specifically, as shown in FIG. 9, the offset angle formed by the light receiving face of the first reflector and the light receiving face of the second reflector is preferably more than or equal to 75 degrees and less than or equal to 105 degrees (between characteristic F and characteristic H), at which the amount of light received is relatively large and the fluctuation range is relatively low.

[4] In accordance with a preferred embodiment according to any one of the scanner mirrors mentioned above, the first and second reflectors are arranged with respect to each other such that the offset angle is more than or equal to 85 degrees and less than or equal to 95 degrees. For example, the relative positional relationship is such that the offset angle formed by the light receiving face of the first reflector and the light receiving face of the second reflector is more than or equal to 85 degrees and less than or equal to 95 degrees. With this configuration, the fluctuation range of the amount of light received by the photodetector (the difference between the minimum and maximum amounts of light received) according to displacement of the first reflector and the second reflector in a single scan of the reflected light can be effectively reduced. This effect will be described in the "Comparison with Comparison Example of Scanner Mirror" section below. Specifically, as shown in FIG. 9, the offset angle formed by the light receiving face of the first reflector and the light receiving face of the second reflector is most preferably 90 degrees (characteristic G), at which the fluctuation range is lowest. Also, the offset angle formed by the light receiving face of the first reflector and the light receiving face of the second reflector can be set to more than or equal to 85 degrees and less than or equal to 95 degrees, which is in vicinity (within a range of ±5 degrees) of 90 degrees. In this case, the fluctuation range (the difference between the minimum and maximum amounts of light received) can be effectively reduced.

[5] In accordance with a preferred embodiment according to any one of the scanner mirrors mentioned above, the first and second reflectors are arranged with respect to each other such that the offset angle is 90 degrees.

[6] In accordance with a preferred embodiment according to any one of the scanner mirrors mentioned above, the light receiving faces of the first and second reflectors have surface areas that are substantially equal to each other. For example, the surface area of the light receiving face of the first reflector and the surface area of the light receiving face of the second reflector are approximately equal. With this configuration, the characteristics for the amount of light reflected by the first reflector (the characteristics of the change in the effective light receiving surface area accompanying displacement of the first reflector as seen from the photodetector) and the characteristics for the amount of light reflected by the second reflector (the characteristics of the change in the effective light receiving surface area accompanying displacement of the second reflector as seen from the photodetector) can be made approximately equal. Therefore, when the amount of light reflected by either the first reflector or the second reflector is decreased, the amount of light reflected by the other one can be increased. Thus, the amounts of reflected lights that are guided to and received by the photodetector can be effectively complemented with each other, and the total amount of the reflected lights can be maintained.

[7] In accordance with a preferred embodiment according to any one of the scanner mirrors mentioned above, the first and second reflectors are substantially identical to each other.

[8] In accordance with a preferred embodiment according to any one of the scanner mirrors mentioned above, the scanner mirror further includes a third reflector configured to reflect light from a light source. The third reflector is pivotally arranged about the pivot axis. For example, the third reflector is pivotally supported on the pivot axis. With this configuration, the third reflector can be pivoted by utilizing the pivot axis on which the first reflector and the second reflector are disposed. Therefore, unlike when a separate pivot axis is provided for the third reflector, it is less likely that there will be an increase in the number of parts in the ranging device in which the scanner mirror is installed. Also, pivoting of the third reflector can be synchronized with the pivoting of the first reflector and the second reflector, unlike when a separate driver is provided for the third reflector. Thus, the configuration of the ranging device in which the scanner mirror is installed can be simplified.

[9] In accordance with a preferred embodiment according to any one of the scanner mirrors mentioned above, the third reflector is disposed between the first reflector and the second reflector along the pivot axis. For example, the first reflector, the third reflector, and the second reflector are disposed in this order in one direction along the pivot axis. With this configuration, the third reflector is disposed between the first reflector and the second reflector. Thus, the optical axis of the exit light emitted from the third reflector toward a specific region that includes an object can be brought as close as possible to the reflection optical axis (reception optical axis) of light reflected from the object located within the specific region. Therefore, parallax can be lessened. Thus, even if the distance to the object is relatively short, a ranging device will still be able to accurately measure the distance to that object.

[10] In accordance with a preferred embodiment according to any one of the scanner mirrors mentioned above, the first reflector is disposed between the third reflector and the second reflector along the pivot axis. For example, the third reflector, the first reflector, and the second reflector are disposed in this order in one direction along the pivot axis. With this configuration, with a ranging device or the like in which the scanner mirror is installed, the optical system on the exit light side that includes the third reflector can be disposed away from the optical system on the reflected light side that includes the first reflector and the second reflector. Thus, the optical design within the ranging device can be easily adjusted.

[11] In accordance with a preferred embodiment according to any one of the scanner mirrors mentioned above, the light receiving faces of the first and second reflectors have surface areas that are greater than a surface area of a reflecting face of the third reflector. For example, the surface area of each of the light receiving faces of the first reflector and the second reflector is greater than the surface area of the reflecting face of the third reflector. With this configuration, light reflected from an object located within a specific region can be reliably received by the first reflector and the second reflector, and can be reliably reflected by (guided to) the photodetector.

[12] In accordance with a preferred embodiment according to any one of the scanner mirrors mentioned above, the third reflector has a reflecting face that faces in a direction that is substantially parallel to the direction in which the light receiving face of the second reflector faces.

[13] In accordance with a preferred embodiment according to any one of the scanner mirrors mentioned above, the reflecting mirror further has a support that pivotally supports the first and second reflectors about the pivot axis.

[14] In accordance with a preferred embodiment according to any one of the scanner mirrors mentioned above, the support includes a pair of end parts, a middle part that is disposed between the end parts and to which the first and second reflectors are attached, and a pair of torsional parts disposed between the middle part and the end parts, respectively.

[15] In accordance with a preferred embodiment according to any one of the scanner mirrors mentioned above, the torsional parts each have a meander structure.

With this configuration, the scanner mirror includes the support that supports the first reflector and the second reflector. The support includes the end parts in the pivot axis direction, and the torsional parts having the meander structures. The torsional parts are located between the middle part and the end parts. Thus, the support can be easily pivoted with respect to the end parts by means of the torsional parts having the meander structures. As a result, the first reflector and second reflector supported by the support can be pivoted over the specific angle range in a state of having the relative positional relationship.

[16] In accordance with a preferred embodiment according to any one of the scanner mirrors mentioned above, the scanner mirror further includes a light blocker disposed between the third reflector and one of the first and second reflectors along the pivot axis.

[17] In accordance with a preferred embodiment according to any one of the scanner mirrors mentioned above, the specific angle range is 45 degrees.

[18] In view of the state of the known technology and in accordance with another aspect of the present invention, a ranging device includes a light source, the scanner mirror according to any one of the scanner mirrors mentioned above, and a light receiver. The scanner mirror is configured to reflect light that has been emitted from the light source and reflected by an object. The light receiver is configured to receive the light from the scanner mirror.

[19] In accordance with a preferred embodiment according to the ranging device, the ranging device further includes a pair of reflecting mirrors configured to reflect the light from the scanner mirror towards the light receiver.

[20] In accordance with a preferred embodiment according to any one of the ranging devices mentioned above, the reflecting mirrors are configured to reflect the light that has been reflected on the first and second reflectors, respectively.

With the present disclosure, as discussed above, it is less likely that the fluctuation range of the amount of light received by the photodetector (the difference between the minimum and maximum amounts of received light) according to displacement of reflectors having light receiving faces.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A scanner mirror comprising:
a reflecting mirror having first and second reflectors that are pivotally arranged about a pivot axis, the first and second reflectors having light receiving faces, respectively, the light receiving faces facing in directions that are angularly offset with each other about the pivot axis and being arranged to simultaneously receive light reflected by an object; and
a driver that drives the reflecting mirror to pivot the first and second reflectors within a specific angle range such that the light receiving faces of the first and second reflectors simultaneously receive the light reflected by the object.

2. The scanner mirror according to claim 1, wherein the first and second reflectors pivot together while substantially maintaining an offset angle between the light receiving faces about the pivot axis.

3. The scanner mirror according to claim 2, wherein the offset angle is more than or equal to 75 degrees and less than or equal to 105 degrees.

4. The scanner mirror according to claim 2, wherein the offset angle is more than or equal to 85 degrees and less than or equal to 95 degrees.

5. The scanner mirror according to claim 2, wherein the offset angle is 90 degrees.

6. The scanner mirror according to claim 1, wherein the light receiving faces of the first and second reflectors have surface areas that are substantially equal to each other.

7. The scanner mirror according to claim 1, wherein the first and second reflectors are substantially identical to each other.

8. The scanner mirror according to claim 1, further comprising:
a third reflector that reflects light from a light source, the third reflector being pivotally arranged about the pivot axis.

9. The scanner mirror according to claim 8, wherein the third reflector is disposed between the first reflector and the second reflector along the pivot axis.

10. The scanner mirror according to claim 8, wherein the first reflector is disposed between the third reflector and the second reflector along the pivot axis.

11. The scanner mirror according to claim 8, wherein the light receiving faces of the first and second reflectors have surface areas that are greater than a surface area of a reflecting face of the third reflector.

12. The scanner mirror according to claim 8, wherein the third reflector has a reflecting face that faces in a direction that is substantially parallel to the direction in which the light receiving face of the second reflector faces.

13. The scanner mirror according to claim 1, wherein the reflecting mirror further has a support that pivotally supports the first and second reflectors about the pivot axis.

14. The scanner mirror according to claim 13, wherein the support includes a pair of end parts, a middle part that is disposed between the end parts and to which the first and second reflectors are attached, and a pair of torsional parts disposed between the middle part and the end parts, respectively.

15. The scanner mirror according to claim 14, wherein the torsional parts each have a meander structure.

16. The scanner mirror according to claim 8, further comprising
a light blocker disposed between the third reflector and one of the first and second reflectors along the pivot axis.

17. The scanner mirror according to claim 1, wherein the specific angle range is 45 degrees.

18. A ranging device comprising
a light source;
a scanner mirror including
    a reflecting mirror having first and second reflectors that are pivotally arranged about a pivot axis, the first and second reflectors having light receiving faces, respectively, the light receiving faces facing in directions that are angularly offset with each other about the pivot axis, the light receiving faces being arranged to simultaneously receive and reflect light that has been emitted from the light source and reflected by an object, and
    a driver that drives the reflecting mirror to pivot the first and second reflectors within a specific angle range such that the light receiving faces of the first and second reflectors simultaneously receive and reflect the light; and
a light receiver that receives the light from the scanner mirror.

19. The ranging device according to claim 18, further comprising
a first mirror member that reflects the light from the scanner mirror towards the light receiver, and
a second mirror member that reflects the light from the scanner mirror towards the light receiver.

20. A ranging device comprising
a light source;
a scanner mirror including
    a reflecting mirror having first and second reflectors that are pivotally arranged about a pivot axis, the first and second reflectors having light receiving faces, respectively, the light receiving faces facing in directions that are angularly offset with each other about the pivot axis, and
    a driver that drives the reflecting mirror to pivot the first and second reflectors within a specific angle range, the scanner mirror reflecting light that has been emitted from the light source and reflected by an object;
first and second mirror members that reflect the light that has been reflected on the first and second reflectors, respectively;
a light receiver that receives the light from the first and second mirror members,
the first and second mirror members reflecting the light from the first and second reflectors of the scanner mirror towards the light receiver.

* * * * *